(12) United States Patent
Reilly et al.

(10) Patent No.: US 10,832,555 B2
(45) Date of Patent: Nov. 10, 2020

(54) REMOTE MONITORING SYSTEM

(71) Applicant: The Bosworth Company, East Providence, RI (US)

(72) Inventors: Douglas L. Reilly, North Kingstown, RI (US); John C. DeBossu, Pawtucket, RI (US); Lawrence B. Medwin, Action, MA (US)

(73) Assignee: THE BOSWORTH COMPANY, East Providence, RI (US)

( * ) Notice: Subject to any disclaimer, the term of this patent is extended or adjusted under 35 U.S.C. 154(b) by 0 days.

(21) Appl. No.: 16/424,792

(22) Filed: May 29, 2019

(65) Prior Publication Data

US 2019/0371152 A1 Dec. 5, 2019

Related U.S. Application Data

(60) Provisional application No. 62/678,633, filed on May 31, 2018.

(51) Int. Cl.
*G08B 21/18* (2006.01)
*F04B 19/04* (2006.01)
(Continued)

(52) U.S. Cl.
CPC ............ *G08B 21/18* (2013.01); *A01G 23/10* (2013.01); *F04B 19/04* (2013.01); *H04W 4/14* (2013.01); *F04B 2201/0801* (2013.01); *H04Q 9/00* (2013.01); *H04Q 2209/00* (2013.01); *H04Q 2209/823* (2013.01)

(58) Field of Classification Search
CPC ......... G08B 21/18; A01G 23/10; F04B 19/04; F04B 2201/0801; H04W 4/14; H04Q 9/00; H04Q 2209/00; H04Q 2209/823
See application file for complete search history.

(56) References Cited

U.S. PATENT DOCUMENTS 8,653,777 B2 * 2/2014 Noguchi ............. H02P 29/0241
318/479
9,439,050 B2 * 9/2016 Ward ...................... H04W 4/14
(Continued)

FOREIGN PATENT DOCUMENTS

CA 2959380 A1 * 8/2017 ............. A01G 23/14
CA 2959380 A1 8/2017

*Primary Examiner* — Franklin D Balseca
(74) *Attorney, Agent, or Firm* — Cantor Colburn LLP (57) ABSTRACT

A remote monitoring system and a method of operating a system having a pump is provided. The remote monitoring system includes a vacuum/pressure sensor coupled to measure a vacuum or a pressure in the system. A temperature sensor is positioned to measure an ambient temperature. A fluid level sensor is positioned to measure fluid in a collection tank. A controller is operably coupled to the vacuum/pressure sensor, the temperature sensor and the fluid level sensor, the controller having a communications circuit that is operable to transmit and receive signals via a cellular SMS text message communications medium, the controller having one or more processors that are responsive to nontransitory executable computer instructions, the one or more processors being responsive to change the operation of the pump in response to an operating signal from the communications circuit, the temperature sensor or the vacuum/pressure sensor or the fluid level sensor.

19 Claims, 6 Drawing Sheets

(51) Int. Cl.
*H04W 4/14* (2009.01)
*A01G 23/10* (2006.01)
*H04Q 9/00* (2006.01)

(56) References Cited

U.S. PATENT DOCUMENTS

| | | | |
|---|---|---|---|
| 9,589,287 B2* | 3/2017 | Hill | G06Q 50/01 |
| 10,683,712 B2* | 6/2020 | Demick | B66D 1/00 |
| 2018/0140965 A1* | 5/2018 | Flora | B01D 3/148 |
| 2018/0152076 A1* | 5/2018 | Alei | H02K 5/1735 |

* cited by examiner

REMOTE MONITORING SYSTEM

CROSS REFERENCE TO RELATED APPLICATIONS

This application claims the benefit of U.S. Provisional Application Ser. No. 62/678,633, filed May 31, 2018, the entire disclosure of which is incorporated herein by reference.

BACKGROUND

The subject matter disclosed herein relates to a remote monitoring system, and in particular to a remote monitoring system that controls a pump and transmits messages to an operator via an SMS text message.

Many systems utilize vacuum as a means for transporting a working fluid, such as maple sap in a maple syrup collection system. In the event the system develops a leak, a loss of vacuum may occur resulting in the system operating at lower efficiency. It should be appreciated that it is desirable for an operator to know when a vacuum leak occurs so that repairs could be made.

Further, in some instances the system may be located in an environment that is periodically subject to temperatures below the freezing point of the working fluid moving through the system. It should be appreciated that if the vacuum pump is started when the working fluid is frozen or partially frozen, the operating life of the pump may be reduced.

Accordingly, while existing systems having a pump are suitable for their intended purposes, the need for improvement remains, particularly in providing a remote monitoring system for the system.

BRIEF DESCRIPTION

According to one aspect of the disclosure, a remote monitoring system for a system having a pump is provided. The remote monitoring system includes a vacuum/pressure sensor coupled to measure a vacuum or a pressure in the system. A temperature sensor is positioned to measure an ambient temperature. A controller is operably coupled to the vacuum/pressure sensor and temperature sensor, the controller having a communications circuit that is operable to transmit and receive signals via a cellular SMS text message communications medium, the controller having one or more processors that are responsive to nontransitory executable computer instructions, the one or more processors being responsive to change the operation of the pump in response to an operating signal from the communications circuit, the temperature sensor or the vacuum/pressure sensor.

According to another aspect of the disclosure, a method of monitoring a system having a vacuum pump is provided. The method includes measuring a vacuum level of a conduit in the system. The vacuum level is compared to a first predetermined vacuum threshold. A first SMS text message is transmitted based on the vacuum level being less than the first predetermined vacuum threshold. The vacuum level is compared to a second predetermined vacuum threshold. A second SMS text message is transmitted based on the vacuum level being less than a second predetermined vacuum threshold. The vacuum pump is turned off based on the vacuum level being less than a second predetermined vacuum threshold.

According to yet another aspect of the disclosure, a method of monitoring a system having a vacuum pump is provided. The method includes measuring an ambient temperature. The ambient temperature is compared to a first predetermined temperature threshold. The vacuum pump is turned on based on the ambient temperature being greater than the first predetermined temperature threshold. The ambient temperature is compared to a second predetermined temperature threshold. The vacuum pump is turned off based on the ambient temperature being less than the second predetermined temperature threshold. At least one of the first predetermined temperature threshold or second predetermined temperature threshold is set in response to receiving a first SMS text message.

According to yet another aspect of the disclosure, a remote monitoring system for a maple sap collection system is provided, the collection system having a conduit coupled to a plurality of maple trees and a vacuum pump coupled between the conduit and a collection tank. The system includes a vacuum sensor coupled to the conduit and a temperature sensor positioned to measure an ambient temperature. A float sensor is disposed within the collection tank. A controller operably is coupled to the vacuum sensor and temperature sensor. The controller has a communications circuit that is operable to transmit and receive signals via a cellular SMS text message communications medium. The controller further has one or more processors that are responsive to nontransitory executable computer instructions, the one or more processors being responsive to change the operation of the vacuum pump in response to an operating signal from the communications circuit, the temperature sensor, the vacuum sensor, or the float sensor.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a remote monitoring system for vacuum based systems. Embodiments of the present disclosure provide advantages in allowing the alerting of an operator and the controlling of the vacuum-based system using cellular SMS text messages. Further embodiments of the present disclosure provide advantages in controlling the operation of a vacuum pump based on ambient temperature.

Figure 1:
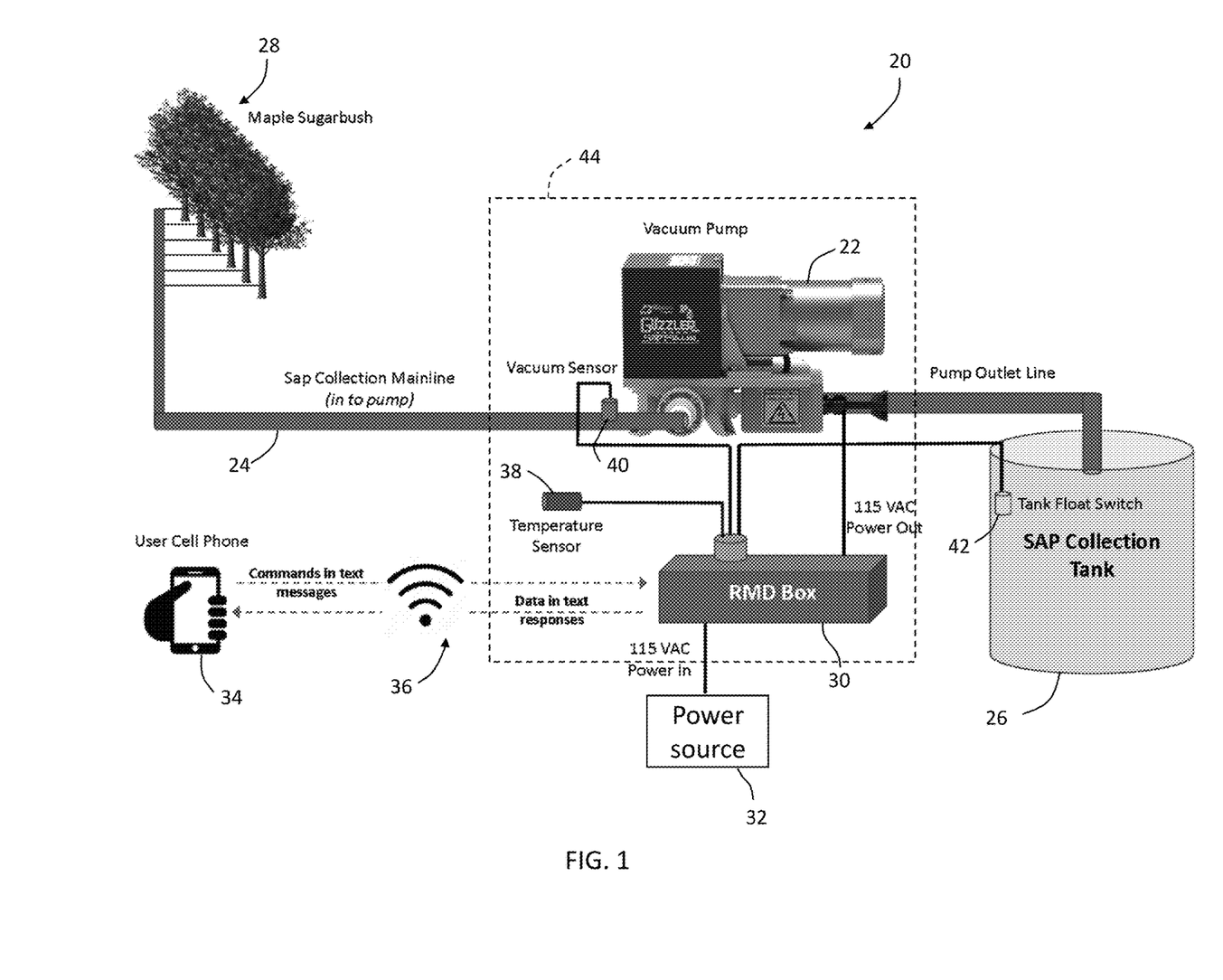
FIG. 1 is a schematic illustration of a vacuum based system having a remote monitoring device in accordance with an embodiment.

Referring now to FIG. 1, a system 20 is shown that utilizes a vacuum pump 22 to move a working fluid through a conduit 24 to a collection tank 26. In the exemplary embodiment, system 20 is a sap collection system and the conduit 24 is coupled to a plurality of maple trees 28. It should be appreciated that while embodiments herein describe the system with respect to a maple sap collection system, this is for exemplary purposes and the claims should not be so limited. In other embodiments, the system 20 may be any system that utilizes a vacuum pump to move a working fluid. In some embodiments, the system 20 is located in an environment where the vacuum pump is subject to temperatures that may cause the working fluid to freeze on a periodic or aperiodic basis.

The system 20 further includes a remote monitoring device 30 that is electrically disposed between a power source 32 and the vacuum pump 22. As described in more detail herein, the device 30 is configured to transmit and receive signals from a remote device 34, such as a cellular phone, via an SMS text message communications medium 36. Electrically connected to the device 30 are a plurality of sensors. In the exemplary embodiment, the sensors include an ambient temperature sensor 38, a vacuum/pressure sensor 40 and a float tank sensor 42. In an embodiment, the vacuum/pressure sensor measures over a range of −14.5 psi to 0 psi (29 in of Hg to 0 in of Hg) of vacuum (negative pressure) and 0 psi to 30 psi of positive pressure. In an embodiment, the device 30 and pump 22 are disposed within a housing 44 that protects them from the environment.

Figure 2:
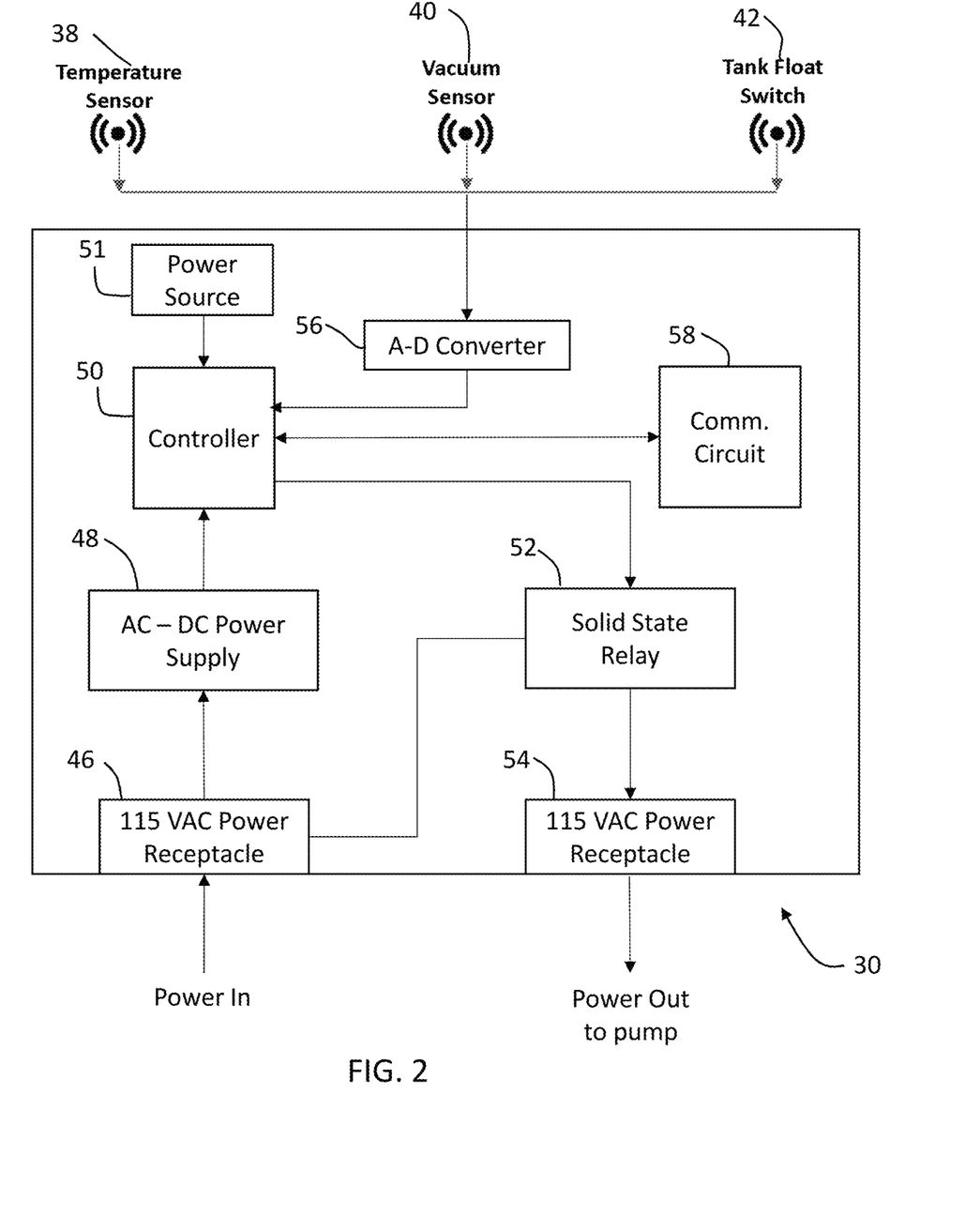
FIG. 2 is a schematic illustration of the remote monitoring device of FIG. 1.

Referring now to FIG. 2, an embodiment is shown of the device 30. In an embodiment, the device 30 includes an input power receptacle 46 that is electrically coupled to the power source 32. The input receptacle 46 connects with an AC to DC power supply 48. The power supply 48 converts the input electrical power (e.g. 115 VAC) into a suitable direct current electrical power (e.g. 5 VDC) that is supplied to a controller 50. As will be discussed in more detail herein, the controller 50 includes one or more processors that are responsive to nontransitory executable computer instructions for performing control methods such as monitoring the operation of the system 20. A power source 51 provides a backup power supply to the controller 50 in the event of loss of power at the receptacle 46. In an embodiment, the power source 51 may be a battery or a capacitor. The power source may be sized to have sufficient energy density to allow for a transmission of a "loss of power" message via the communications circuit 58 to the operator and a controlled shut down of the controller 50. As discussed in more detail herein, the communications circuit may transmit the message as an SMS text message.

The controller 50 is electrically coupled to transmit a signal to a switch, such as solid-state relay 52. The relay 52 is electrically coupled to the input power receptacle 46. As will be described in more detail herein, the controller 50 is configured to selectively change the state of the relay 52 between an open and a closed position. When in the closed position, electrical power flows from the input receptacle 46 to an output receptacle 54. The output receptacle 54 is electrically connect to the vacuum pump 22. Thus, controller 50 may selectively control the flow of electrical power to the vacuum pump 22 and control the operational state (e.g. on or off) of the vacuum pump 22.

The controller 50 is further electrically connected to receive input signals from the sensors 38, 40, 42. In an embodiment, the sensors 38, 40, 42 transmit an analog signal and an analog-to-digital converter 56 is electrically disposed between the sensors 38, 40, 42 and the controller 50 to convert the sensor signals into a digital signal that may be received by the controller 50. In another embodiment, one or more of the sensors 38, 40, 42 transmit digital signals that are directly received by the controller 50.

The controller 50 is further electrically connected to transmit and receive signals with a communications module or circuit 58. The communications circuit 58 is operable to transmit and receive signals from a remote device. In the exemplary embodiment, the communications circuit 58 is configured to transmit and receive Short Message Service (SMS) text messages via a cellular phone network. In an embodiment, the SMS text messages comply with 3rd Generation Partnership Project (3GPP) technical standard 23.040. It should be appreciated that the communications circuit 58 may include antennas and other components as are known in the art that allow the communications circuit to connect to the cellular phone network.

Figure 3:
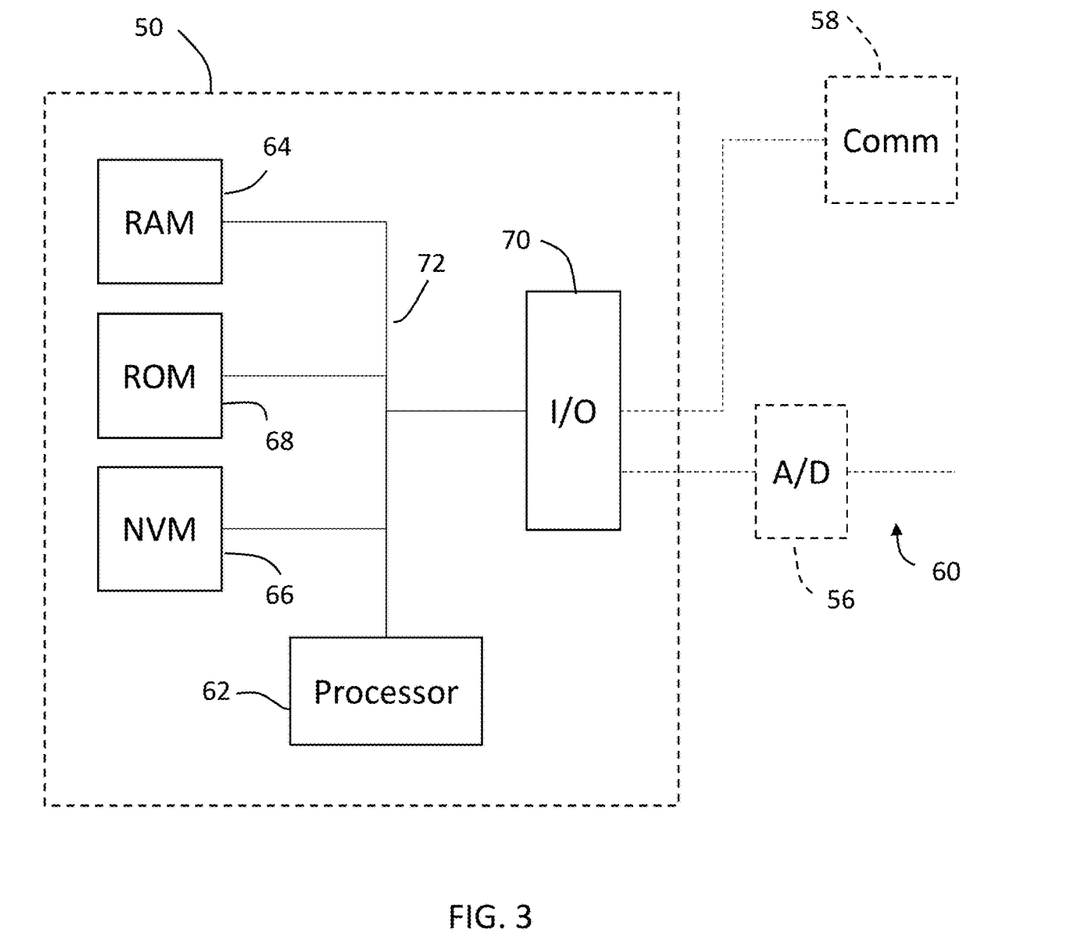
FIG. 3 is a schematic illustration of a controller for use with the remote monitoring device of FIG. 1.

Referring now to FIG. 3, an embodiment is shown of the controller 50. In an embodiment, the system 20 operation is controlled by controller 50. Controller 50 is a suitable electronic device capable of accepting data and instructions, executing the instructions to process the data, and presenting the results. Controller 50 may accept instructions through user interface, or through other means such as but not limited to electronic data card, voice activation means, manually-operable selection and control means, radiated wavelength and electronic or electrical transfer. Therefore, controller 50 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing. In the exemplary embodiment, the controller 50 is a Raspberry Pi single board computer.

In an embodiment, the controller 50 is capable of converting the analog voltage or current level provided by sensors 38, 40, 42 into a digital signal indicative of the level of vacuum in the conduit 24, the ambient temperature or the amount of working fluid (e.g. sap) in the tank 26. It should be appreciated that the analog to digital converter 56 may be integrated into the controller 50 as illustrated in FIG. 3, or be a separate component as illustrated in FIG. 2. Controller 50 uses the digital signals act as input to various processes for monitoring or controlling the system 20. The digital signals represent one or more system 20 data including but not limited to vacuum level, pressure level, temperature and fluid height and the like.

Controller 50 is operably coupled with one or more components of system 20 by data transmission media 60. Data transmission media 60 includes, but is not limited to, twisted pair wiring, coaxial cable, and fiber optic cable. Data transmission media 60 also includes, but is not limited to, wireless, radio and infrared signal transmission systems. In the embodiment shown in FIG. 1, transmission media 60 couples controller 50 to sensors 38, 40, 42, and relay 52. Controller 50 is configured to provide operating signals to these components and to receive data from these components via data transmission media 60.

In general, controller 50 accepts data from sensors 38, 40, 42 and is given certain instructions for the purpose of comparing the data from sensors 38, 40, 42 to predetermined operational parameters. Controller 50 provides operating signals to relay 52 and communications circuit 58. Controller 50 also accepts data from sensors 38, 40, 42, indicating, for example, whether the vacuum level in conduit 22 is within a predetermined range, whether the ambient temperature is within an operating range and whether the fluid in tank 26 is has reached a predetermined level. The controller 50 compares the operational parameters to predetermined variances (e.g. low vacuum level, low temperature, tank is full) and if the predetermined variance is exceeded, generates a signal that is transmitted via the communications circuit 58 to the cellular network 36. Additionally, the signal may initiate other control methods that adapt the operation of the system 20 such as removing electrical power from the vacuum pump 22. For example, if sensor 40 measures or registers a vacuum level below a predetermined threshold, this may indicate a leak within the conduit 24 upstream from the vacuum pump 22. In other embodiments, if the sensor 38 detects a temperature that is below a predetermined threshold, this may indicate the potential for the working fluid (e.g. sap) to be frozen. In an embodiment, to extend the life of the vacuum pump 22, the controller 50 may initiate a change in operation state signal to relay 56 resulting in vacuum pump 22 being turned on or off. Another example includes a low vacuum pressure alert being transmitted. Here, the controller 50 may transmit an SMS message via communications circuit 56 to alert the operator that a leak may have occurred within the system 20. In an embodiment, where the communications circuit 58 is a cellular circuit (e.g. transmits SMS text messages), the controller 50 may track the status of the cellular subscription and transmit a message to the user a predetermined time period in advance of the expiration of the subscription to warn the user that the subscription is expiring.

In an embodiment, the data received from sensors 38, 40, 42 may be displayed on a user interface of device 34. In an embodiment, the operator may transmit an SMS message (e.g. ?status, ?tank, ?temp or ?vac) to the controller 50 and receive back the current measurement. In some embodiments, the operator may transmit other predetermined SMS messages to either set thresholds or control the operation of vacuum pump 22. In an embodiment, the operator may set a first temperature threshold (e.g. =temp on <33>) where relay 52 is closed and the vacuum pump 22 is turned on. The operator may further set a second temperature threshold (e.g. =temp off <29>) where the relay 52 is opened and the vacuum pump 22 is turned off. Similarly, vacuum thresholds may also be set. In an embodiment, there is a first vacuum threshold (e.g. =vac warning <value>) that sets when an SMS message is transmitted to the operator and a second vacuum threshold (e.g. =vac alert <value>) where a loss of vacuum SMS message is sent to the operator and the relay 52 is opened to turn off the vacuum pump 22. In an embodiment, the operator may transmit start and stop commands via SMS messages that turn on and turn off the vacuum pump 22 respectively, regardless of the sensor 38, 40, 42 levels; a "run" command may transmitted via SMS message to return the controller 50 to sensor control.

In some embodiments, the controller 50 may be configured to operate in a service or repair mode of operation. The changing between the normal operation and the service operation may be performed via an SMS message command. In this embodiment, the operator may send a message to the controller 50 that turns on the service mode and also defines a service phone number that messages will be sent to. In an embodiment, when in service mode, the controller 50 is configured to transmit and receive SMS messages from the operator's phone number and the defined service phone number.

In an embodiment, the data received from sensors 38, 40, 42 may be displayed on a user interface (not shown) directly or indirectly coupled to controller 50. The user interface may be an LED (light-emitting diode) display, an LCD (liquid-crystal diode) display, a CRT (cathode ray tube) display, or the like. A keypad may also be coupled to the user interface for providing data input to controller 50. In an embodiment, the controller 50 has an input port (e.g. a USB port) that allows an external computing device to be directly connected to the controller 50.

Controller 50 includes one or more processors 62 coupled to a random-access memory (RAM) device 64, a non-volatile memory (NVM) device 66, a read-only memory (ROM) device 68, and one or more input/output (I/O) controllers 70 via a data communications bus 72.

I/O controllers 70 are coupled to sensors 38, 40, 42 via analog-to-digital (A/D) converter 56. I/O controllers 70 are also coupled to relay 52 and communications circuit 58.

NVM device 66 is any form of non-volatile memory such as an EPROM (Erasable Programmable Read Only Memory) chip, a disk drive, or the like. Stored in NVM device 66 are various operational parameters for the application code. The various operational parameters can be input to NVM device 66 either locally, using a keypad or remote device 34. It will be recognized that application code can be stored in NVM device 66 rather than ROM device 68.

Figure 4:
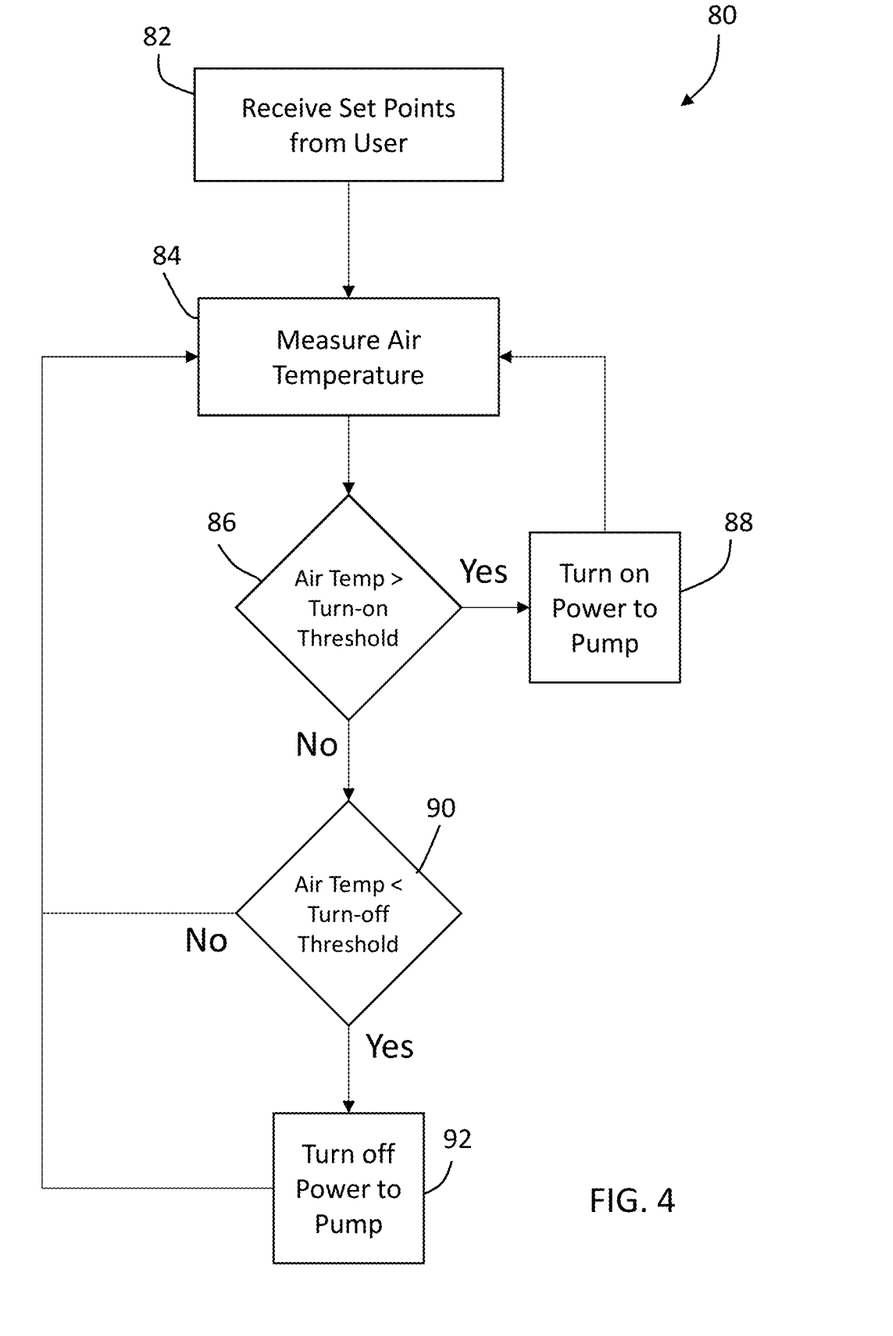
FIG. 4 is a flow diagram of a process for activating and deactivating a pump in the vacuum-based system of FIG. 1.
Figure 5:
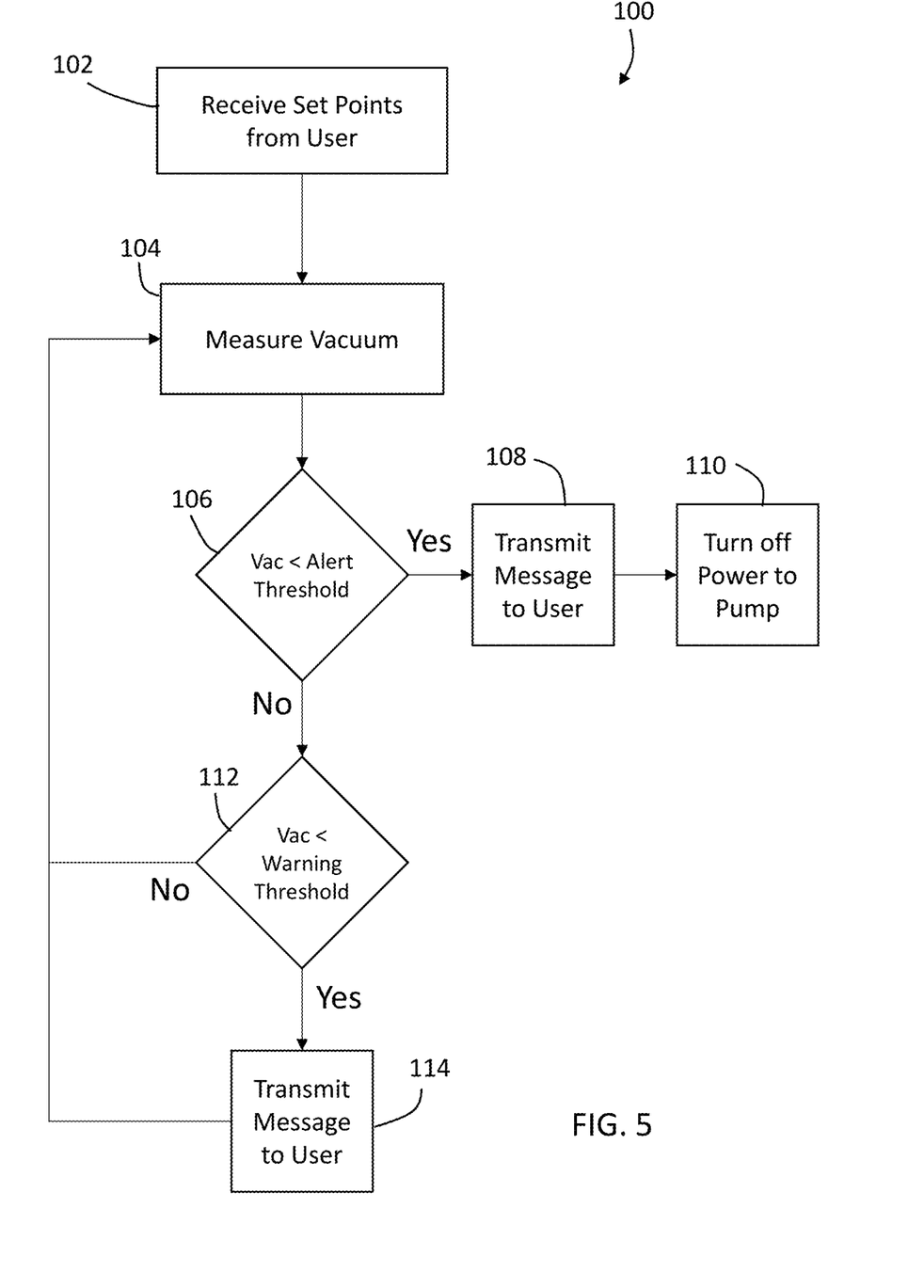
FIG. 5 is a flow diagram of a process of communicating alerts to an operator in response to a reduction in vacuum.

Controller 50 includes operation control methods embodied in application code, such as that shown in FIG. 4 and FIG. 5. These methods are embodied in computer instructions written to be executed by processor 62, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), HTML5, Python, Ruby, Scratch, JavaScript, JQuery Perl, Erlang, and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Referring now to FIG. 4, an embodiment of a method 80 is shown for operating the system 20 based on the ambient temperature. It should be appreciated that in embodiments where the system 20 is located outside, such as a maple sap collection system, the conduit 24 and the vacuum pump 22 may be subjected to a varying temperature, including temperatures below the freezing point of the working fluid (e.g. maple sap). Therefore, it may be undesirable to operate the vacuum pump 22 when the working fluid within the vacuum pump 22 or the conduit 24 is frozen.

In this embodiment, the operator sets the first temperature threshold (the temperature to turn on the vacuum pump 22, e.g. 33 F) and the second temperature threshold (the temperature to turn off the vacuum pump 22, e.g. 29 F) in block 82. The method 80 then proceeds to block 84 where the ambient air temperature is measured. It should be appreciated that in other embodiments, other temperatures other than air may be measured, such as but not limited to working fluid temperature in the conduit 24 and vacuum pump 22 housing temperature for example.

The method 80 then proceeds to query block 86 where the measured temperature is compared with the first or "turn-on" temperature threshold. When the query block 86 returns a positive (temperature is above threshold), the method 80 proceeds to block 88 where the relay 52 is closed and the vacuum pump 22 is turned on and the method 80 loops back to block 84. When the query block 86 returns a negative, the method 80 proceeds to query block 90 where the measured temperature is compared with the second or "turn-off" temperature threshold. When the query block 90 returns a negative (the temperature is above the turn-off temperature), the method loops back to block 84. When the query block 90 returns a positive (the measured temperature is below the turn-off temperature), the method 80 proceeds to block 92 where the relay 52 is opened and the vacuum pump 22 is turned off.

Referring now to FIG. 5, a method 100 is shown for transmitting alerts to the operator based on the vacuum levels in conduit 24. The method 100 starts in block 102 where the user set points for the vacuum levels are received. In the illustrated embodiment, there are two vacuum thresholds, the first or warning vacuum threshold (e.g. 15 in Hg) is set by the operator on the level where they would like an an SMS message sent to them, while the second or alert vacuum threshold (e.g. 2 in Hg) is set by the operator at the level of near total loss of vacuum and where they would like the vacuum pump 22 turned off in addition to the sending of an SMS message.

Once the thresholds are set, the method 100 proceeds to block 104 where the vacuum level is measured in the conduit 24. In the illustrated embodiment, the vacuum sensor 40 is positioned adjacent to the inlet of the vacuum pump 22. The method 100 then proceeds to query block 106 where the measured vacuum level is compared with the second or alert vacuum threshold. When the query block 106 returns a positive (conduit 24 nearing loss of vacuum), the method 100 proceeds to block 108 where the SMS message is transmitted to the operator notifying them of the loss of vacuum. The method 100 then proceeds to block 110 where the relay 52 is opened and the vacuum pump 22 is turned off.

When the query block 106 returns a negative, the method 100 then proceeds to query block 112 where the measured vacuum is compared with the first or warning vacuum threshold. When the query block 112 returns a negative, meaning there is sufficient vacuum in the conduit 24, the method 100 loops back to block 104. When the query block 112 returns a positive, the method 100 proceeds to block 114 where an SMS message warning the operator that there might be a vacuum leak is transmitted to the operator. Once the SMS message is sent, the method 100 loops back to block 104.

It should be appreciated that in some embodiments, the methods 80, 100 may be performed in parallel or simultaneously. This allows the operation of the vacuum pump 22 to be controlled automatically based on both the temperature and vacuum levels.

Figure 6:
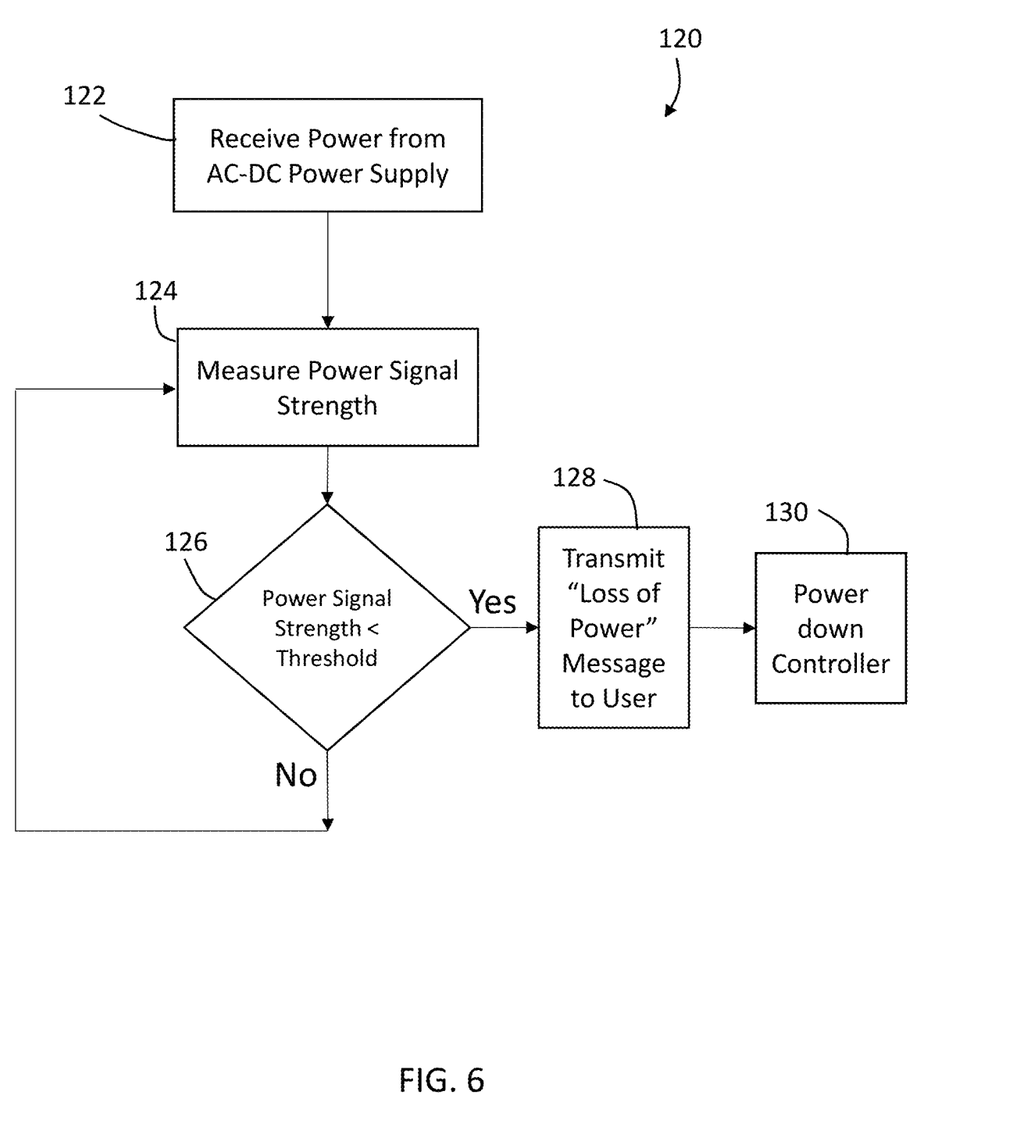
FIG. 6 is a flow diagram of a process for communicating a loss of power alert to an operator.

Referring now to FIG. 6, a method 120 is shown for transmitting an alert to the operator based on a loss of electric power, such as AC power, to the system 20. It should be appreciated that in some embodiments, the system 20 may be operated in a remote location (e.g. a sugar bush located in a forest) where power source 32 may generate the electrical power locally, such as with a portable electrical generator set that operates on gasoline or propane for example. In such embodiments, the system 20 may be operated without the operator being present. Therefore, in the event the power source 32 runs out of fuel, the system 20 will stop operating. The method 120 starts in block 122 where the system 20 receives power from the AC-DC power supply 32. In the illustrated embodiment, there is a DC power threshold for the system 20 to operate. Block 124 measures the power signal coming from the AC-DC power supply 122. The query block 126 compares this measured signal strength against the system power threshold and if it falls below the desired threshold, block 128 causes a communications signal to be sent to the user indicating that a loss of signal power has occurred. In an embodiment, the communications signal is an SMS text message as described herein. Block 130 then powers down the system 20. If the power signal strength is greater than the desired threshold for system operation, then the method 120 loops back to block 124 to take another measurement on power signal strength. In this way, the system continuously monitors the strength of the power signal provided to it from the AC-DC power supply, and if there is a loss of power, notifies the user so that corrective action may be taken to restore power. In other embodiments, the monitoring of the strength of the power signal may be performed on a periodic or aperiodic basis.

In some embodiments, such as the maple sap collection system, the system 20 may include a tank 26 that accumulates the working fluid that is drawn through the vacuum pump. In these embodiments, a float switch 42 may be placed in the tank 26 to measure the amount of working fluid in the tank. In one embodiment, the float switch 42 cooperates with the controller 50 as an on/off switch, such that when the level of the working fluid in the tank 26 reaches a predetermined level, the controller automatically opens the relay 52 to turn off the vacuum pump 22. In other embodiments, the level of the working fluid in the tank 26 is directly measured. In this embodiment, parameters of the operation of the system 20 may be determined. These include a rate of change of the level of the working fluid, an estimated time until the tank 26 is full, and a production rate of the working fluid.

It should be appreciated that while embodiments herein described the pump 22 as being a vacuum pump, this is for exemplary purposes and the claims should not be so limited. In other embodiments, the pump 22 applies a pressure to an attached conduit. In these embodiments, the "alert" and "warning" SMS messages may be based on a positive pressure level rather than a vacuum level. For example, if the pressure drops below a first threshold level, an alert SMS message is sent to the operator. When the pressure drops below a second threshold level, a warning SMS message is sent indicating a loss of pressure, the controller 50 then opens the relay to turn off the pump.

It should further be appreciated that while the illustrated embodiments describe the tank 26 as being the destination of the fluid, this is for exemplary purposes and the claims should not be so limited. In other embodiments, the tank 26 is the source of the fluid and the pump 22 is used to drain or remove fluid from the tank. In this embodiment, the float switch 42 may be used to control the level of fluid in the tank 26. For example, the tank 26 may be a reservoir and the float switch 42 turns off the pump 22 when the reservoir is drained to a desired minimum level or to maintain the fluid level below a predetermined maximum level. In an embodiment, the system is configured to use the input from the float switch to maintain the fluid level in the tank 26 between the predetermined minimum and maximum levels. In other words, when the fluid in the source reservoir rose above a predetermined threshold the pump 22 turns on and stays on until the fluid in the source reservoir drops below a second predetermined threshold. In this way, the operation of the system is controlled with the float switch in a similar manner described herein to the way in which the temperature sensor controls the operation of the system.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A remote monitoring system for a system having a pump, the remote monitoring system comprising:
    a vacuum/pressure sensor coupled to measure a vacuum or a pressure in the system having the pump;
    a temperature sensor positioned to measure an ambient temperature; and
    a controller operably coupled to the vacuum/pressure sensor and the temperature sensor, the controller having a communications circuit that is operable to transmit cellular SMS text message communications and to receive cellular SMS text message communications, the controller having one or more processors that are responsive to nontransitory executable computer instructions, the one or more processors being configured to change an operation of the pump in response to operating signals received from the communications circuit, the temperature sensor, and the vacuum/pressure sensor,
    wherein the one or more processors are configured to convert the received cellular SMS text message communications into operating signals upon the receipt of cellular SMS text message communications at the communications circuit, and
    wherein the controller is configured to be simultaneously responsive to the operating signals received from each of the communications circuit, the temperature sensor, and the vacuum/pressure sensor,
    wherein the cellular SMS text message communications received at the communications circuit are plain text messages that include at least: ?status, ?tank, ?temp, and ?vac, wherein each command having a leading ? is a query from a user that prompts a cellular SMS text message communication to be transmitted from the communications circuit.

2. The remote monitoring system of claim 1, wherein the operating signals received from the vacuum/pressure sensor include a vacuum measurement and the one or more processors are responsive to transmit a first cellular SMS text message communication via the communications circuit to a user in response to a vacuum level being below a first vacuum threshold.

3. The remote monitoring system of claim 2, wherein the one or more processors are configured to transmit a second cellular SMS text message communication via the communications circuit to the user and simultaneously cause power to be disconnected from the vacuum pump in response to the vacuum level being below a second vacuum threshold.

4. The remote monitoring system of claim 3, wherein the first vacuum threshold and second vacuum threshold are user definable.

5. The remote monitoring system of claim 4, wherein the one or more processors are configured to set the first vacuum threshold in response to receiving a third cellular SMS text message communication via the communications circuit from the user.

6. The remote monitoring system of claim 5, wherein the communications circuit is configured to transmit to the one or more processors, based on the third cellular SMS text message communication, an operating signal in response to receiving the third cellular SMS text message communication from the user.

7. The remote monitoring system of claim 1, wherein the operating signals received from the temperature sensor include a first temperature measurement and the one or more processors are configured to cause power to be turned on to the pump in response to the first temperature measurement being above a first temperature threshold.

8. The remote monitoring system of claim 7, wherein the operating signals received from the temperatures sensor include a second temperature measurement and the one or more processors are configured to cause power to be turned off to the pump in response to the second temperature measurement being below a second temperature threshold.

9. The remote monitoring system of claim 8, wherein the first temperature threshold and the second temperature threshold are user definable.

10. The remote monitoring system of claim 9, wherein the one or more processors are configured to set at least one of the first temperature threshold or the second temperature threshold in response to receiving an operating signal based on a cellular SMS text message communication via the communications circuit and received from the user.

11. The remote monitoring system of claim 1, wherein the one or more processors are responsive to:
    measure a power signal strength;
    determine when the power signal strength is less than a threshold; and
    transmit a loss of power signal via the communications circuit to a user in the form of a cellular SMS text message communication.

12. A method of monitoring a system having a vacuum pump, the method comprising:
    measuring a vacuum level of a conduit in the system having the vacuum pump;
    simultaneously measuring an ambient temperature;
    comparing the vacuum level to a first predetermined vacuum threshold;

comparing the measured ambient temperature to a turn-off temperature threshold;
transmitting a first cellular SMS text message communication based on at least one of the measured vacuum level being less than the first predetermined vacuum threshold and the measured ambient temperature being less than the turn-off temperature threshold;
comparing the measured vacuum level to a second predetermined vacuum threshold;
transmitting a second cellular SMS text message communication based on the vacuum level being less than the second predetermined vacuum threshold; and
turning off the vacuum pump based on the at least one of vacuum level being less than the second predetermined vacuum threshold and the measured ambient temperature being less than the turn-off temperature threshold,
wherein cellular SMS text message communications received at a communications circuit of the system are plain text messages that include at least: ?status, ?tank, ?temp, and ?vac, wherein each command having a leading ? is a query from a user that prompts a cellular SMS text message communication to be transmitted from the communications circuit.

13. The method of claim 12, further comprising turning on the vacuum pump in response to receiving a third cellular SMS text message communication.

14. The method of claim 13, further comprising setting at least one of the first predetermined vacuum threshold, the second predetermined vacuum threshold, and the turn-off temperature threshold in response to receiving a fourth cellular SMS text message communication.

15. The method of claim 12, further comprising:
measuring a power signal strength;
determining when the power signal strength is less than a threshold; and
transmitting a loss of power signal via a cellular SMS text communication using the communications circuit to a user.

16. A remote monitoring system for a maple sap collection system, the maple sap collection system having a conduit coupled to a plurality of maple trees and a vacuum pump coupled between the conduit and a collection tank, the remote monitoring system comprising:
a vacuum/pressure sensor coupled to the conduit;
a temperature sensor positioned to measure an ambient temperature;
a float sensor disposed within the collection tank; and
a controller operably coupled to the vacuum/pressure sensor and the temperature sensor, the controller having a communications circuit that is operable to transmit cellular SMS text message communications and to receive cellular SMS text message communications, the controller having one or more processors that are responsive to nontransitory executable computer instructions, the one or more processors being configured to change an operation of the vacuum pump in response to operating signals received from the communications circuit, the temperature sensor, the vacuum/pressure sensor, and the float sensor,
wherein the one or more processors are configured to convert the received cellular SMS text message communications into operating signals upon the receipt of cellular SMS text message communications at the communications circuit, and
wherein the controller is configured to be simultaneously responsive to the operating signals received from each of the communications circuit, the temperature sensor, the vacuum/pressure sensor, and the float sensor,
wherein the cellular SMS text message communications received at the communications circuit are plain text messages that include at least: ?status, ?tank, ?temp, and ?vac, wherein each command having a leading ? is a query from a user that prompts a cellular SMS text message communication to be transmitted from the communications circuit.

17. The remote monitoring system of claim 16, wherein:
the operating signals received from the vacuum/pressure sensor include a vacuum measurement and the one or more processors are configured to transmit a first cellular SMS text message communication via the communications circuit in response to a vacuum level being below a first vacuum threshold; and
the one or more processors are responsive to transmit a second cellular SMS text message communication via the communications circuit and simultaneously cause power to be disconnected from the vacuum pump in response to the vacuum level being below a second vacuum threshold.

18. The remote monitoring system of claim 17, wherein:
the first vacuum threshold and the second vacuum threshold are user definable via an SMS text message communication received by the communications circuit from a user; and
the operating signals received from the temperature sensor include a first temperature measurement and the one or more processors are configured to cause power to be turned on to the vacuum pump in response to the first temperature measurement being above a first temperature threshold.

19. The remote monitoring system of claim 18, wherein:
the operating signals received from the temperature sensor include a second temperature measurement and the one or more processors are configured to cause power to be turned off to the vacuum pump in response to the second temperature measurement being below a second temperature threshold; and
the first temperature threshold and the second temperature threshold are user definable via an SMS text message communication received by the communications circuit from a user.

* * * * *